(12) United States Patent
Suh et al.

(10) Patent No.: US 12,063,158 B2
(45) Date of Patent: *Aug. 13, 2024

(54) PACKET FORMAT OF NETWORK ABSTRACTION LAYER UNIT, AND ALGORITHM AND APPARATUS FOR VIDEO ENCODING AND DECODING USING THE FORMAT, QOS CONTROL ALGORITHM AND APPARATUS FOR IPv6 LABEL SWITCHING USING THE FORMAT

(71) Applicant: University-Industry Cooperation Group of Kyung Hee University, Gyeonggi-do (KR)

(72) Inventors: Doug Young Suh, Gyeonggi-do (KR); Kyu Heon Kim, Seoul (KR); Gwang Hoon Park, Gyeonggi-do (KR)

(73) Assignee: University—Industry Cooperation Group of Kyung Hee University, Gyeonggi-Do (KR)

( * ) Notice: Subject to any disclaimer, the term of this patent is extended or adjusted under 35 U.S.C. 154(b) by 303 days.

This patent is subject to a terminal disclaimer.

(21) Appl. No.: 17/178,820

(22) Filed: Feb. 18, 2021

(65) Prior Publication Data

US 2021/0250291 A1     Aug. 12, 2021

Related U.S. Application Data

(63) Continuation of application No. 16/908,845, filed on Jun. 23, 2020, now Pat. No. 11,374,861, which is a
(Continued)

(30) Foreign Application Priority Data

Jan. 12, 2007   (KR) .................. 10-2007-0003809
Jan. 17, 2007   (KR) .................. 10-2007-0005162
Jan. 23, 2007   (KR) .................. 10-2007-0007119

(51) Int. Cl.
*H04L 45/74*     (2022.01)
*H04L 45/302*    (2022.01)
(Continued)

(52) U.S. Cl.
CPC ............ *H04L 45/74* (2013.01); *H04L 45/302* (2013.01); *H04L 69/16* (2013.01); *H04L 69/167* (2013.01);
(Continued)

(58) Field of Classification Search
CPC ..... H04L 12/741; H04L 45/74; H04L 43/302; H04L 69/16; H04L 16/167
See application file for complete search history.

(56) References Cited

U.S. PATENT DOCUMENTS 6,025,877 A    2/2000  Chang et al.
7,657,056 B2   2/2010  Kwon et al.
(Continued)

FOREIGN PATENT DOCUMENTS

JP    2004/056169 A    2/2004
JP    2005/229587 A    8/2005
WO    2006/134110 A1  12/2006

OTHER PUBLICATIONS

Gomila et al., "New features and applications of the H.264 video coding standard," Information Technology: Research and Education2003. Proceedings. ITRE2003. International Conference on Year: 2003 pp. 6-10.
(Continued)

*Primary Examiner* — Anez C Ebrahim
(74) *Attorney, Agent, or Firm* — Occhiuti & Rohlicek LLP

(57) ABSTRACT

The construction method of NALU (Network Abstraction Layer Unit) for IPv6 label switching and its using algorithms of video encoding, QoS control, and decoding are provided.
(Continued)

According to an embodiment of the present invention, the NALU format is composed of the NALH (Network Abstraction Layer Header) including the label and the NAL (Network Abstraction Layer) payload. Here, the label is determined based on layer information which is combination of a spatial scalable level, a temporal scalable level, and a quality scalable level of the encoded data. The decoder uses the label to decide which one of multiple decoding modules is used to decode the current NAL payload. Moreover, the label can be included in the packet header so that the MANE (Media Aware Network Element) can use the label to decide whether to forward the packet or drop it. For example, the label in the packet header can be used for QoS control of video service by using the flow label field in IPv6 packet header. The IPv6 router can identify priority of the video packet by using the 20 bit long flow label, into which the label in NALH can be inserted. According to the embodiment, the MANE assumed in the MPEG and JVT (Joint Video Team) can be implemented effectively.

8 Claims, 6 Drawing Sheets

Related U.S. Application Data continuation of application No. 15/827,596, filed on Nov. 30, 2017, now Pat. No. 10,728,148, which is a continuation of application No. 14/477,252, filed on Sep. 4, 2014, now Pat. No. 9,853,893, which is a continuation of application No. 12/295,805, filed as application No. PCT/KR2008/000203 on Jan. 11, 2008, now Pat. No. 9,344,362.

(51) Int. Cl.

| | | |
|---|---|---|
| *H04L 69/16* | (2022.01) | |
| *H04L 69/167* | (2022.01) | |
| *H04L 69/22* | (2022.01) | |
| *H04N 19/132* | (2014.01) | |
| *H04N 19/164* | (2014.01) | |
| *H04N 19/169* | (2014.01) | |
| *H04N 19/187* | (2014.01) | |
| *H04N 19/30* | (2014.01) | |
| *H04N 19/46* | (2014.01) | |
| *H04N 19/61* | (2014.01) | |
| *H04N 19/70* | (2014.01) | |
| *H04N 21/2343* | (2011.01) | |
| *H04N 21/643* | (2011.01) | |
| *H04N 21/647* | (2011.01) | |
| *H04N 21/845* | (2011.01) | |

(52) U.S. Cl.
CPC ........... *H04L 69/22* (2013.01); *H04N 19/132* (2014.11); *H04N 19/164* (2014.11); *H04N 19/187* (2014.11); *H04N 19/188* (2014.11); *H04N 19/30* (2014.11); *H04N 19/46* (2014.11); *H04N 19/61* (2014.11); *H04N 19/70* (2014.11); *H04N 21/234327* (2013.01); *H04N 21/64322* (2013.01); *H04N 21/64792* (2013.01); *H04N 21/8451* (2013.01)

(56) References Cited

U.S. PATENT DOCUMENTS

| | | | |
|---|---|---|---|
| 7,715,397 B2 | 5/2010 | Mangal et al. | |
| 7,725,593 B2 | 5/2010 | Visharam et al. | |
| 7,983,170 B2 | 7/2011 | Jackowski et al. | |
| 8,037,397 B2 | 10/2011 | Luo et al. | |
| 8,040,952 B2 | 10/2011 | Park et al. | |
| 8,184,153 B2 | 5/2012 | Kang et al. | |
| 2001/0002906 A1 | 6/2001 | Rune | |
| 2002/0083190 A1* | 6/2002 | Kamiya | H04L 29/06 709/236 |
| 2004/0172383 A1* | 9/2004 | Yoshida | G11B 27/105 |
| 2004/0228413 A1 | 11/2004 | Hannuksela | |
| 2005/0254575 A1 | 11/2005 | Hannuksela et al. | |
| 2005/0280720 A1 | 12/2005 | Kwon et al. | |
| 2006/0050793 A1 | 3/2006 | Wang et al. | |
| 2006/0136356 A1 | 6/2006 | Hua et al. | |
| 2006/0209640 A1* | 9/2006 | Blacquiere | G11B 27/105 |
| 2006/0222079 A1 | 10/2006 | Park et al. | |
| 2006/0251169 A1 | 11/2006 | Wang | |
| 2006/0256723 A1 | 11/2006 | Hellenthal | |
| 2006/0256851 A1 | 11/2006 | Wang et al. | |
| 2006/0256863 A1 | 11/2006 | Wang et al. | |
| 2007/0016594 A1 | 1/2007 | Visharam et al. | |
| 2007/0076799 A1* | 4/2007 | Wan | H04N 19/44 375/240.26 |
| 2007/0201549 A1 | 8/2007 | Hannuksela et al. | |
| 2008/0052605 A1 | 2/2008 | Luo et al. | |
| 2008/0075081 A1 | 3/2008 | Mangal et al. | |
| 2008/0144502 A1 | 6/2008 | Jackowski et al. | |
| 2008/0151817 A1 | 6/2008 | Fitchett et al. | |
| 2008/0225116 A1 | 9/2008 | Kang et al. | |
| 2011/0103366 A1 | 5/2011 | Morimoto et al. | |

OTHER PUBLICATIONS

Kim et al., "Implementation of High Performance CAVLC for H.264/AVC Video Codec," System-on-Chip for Real-Time Applications The 6th International Workshop on Year: 2006 pp. 20-23.

Yin P et al: "High-level SVC Syntax", 17 JVT Meeting; 74.MPEG Meeting; Oct. 14, 2005-Oct. 21, 2005; Nice, FR; (Joint Video Team of ISO/IEC JTC1/SC29/WG11 and ITU-T SG.16),, No. JVT-Q028, Oct. 11, 2005XP030006191.

JVT:"Joint Scalable Video Model JSVM-2", 15. JVT Meeting; 72.MPEG Meeting; Apr. 16, 2005-Apr. 22, 2005; Busan, KR; (Joint Video Team of ISO/IEC JTC1/SC29/WG11 and ITU-T SG.16) No. JVT-O202, May 23, 2005XP030006026.

* cited by examiner

[Fig. 1]
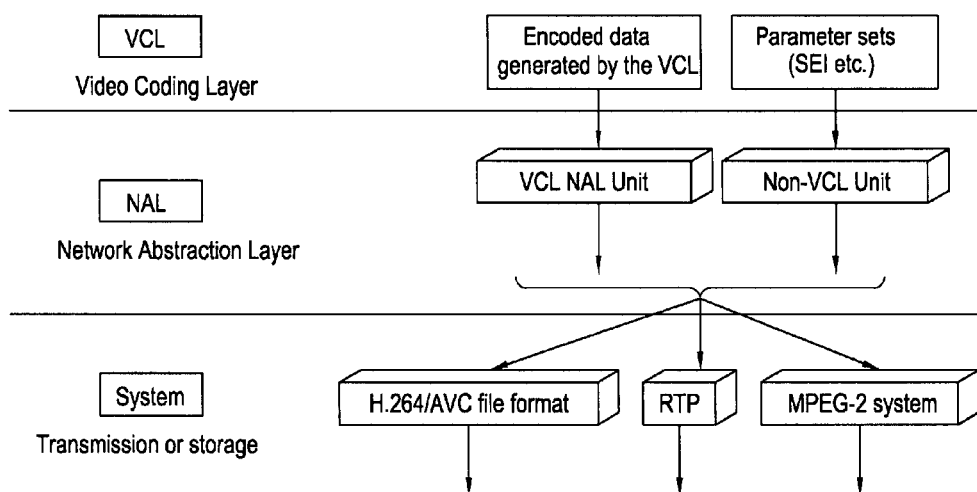
[Fig. 2]
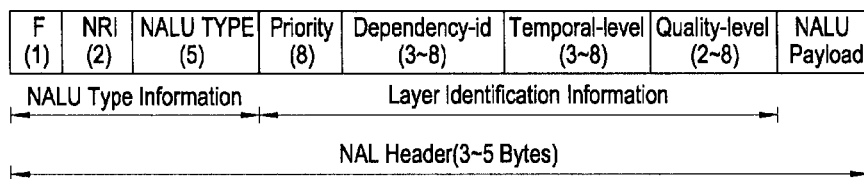

[Fig. 3]
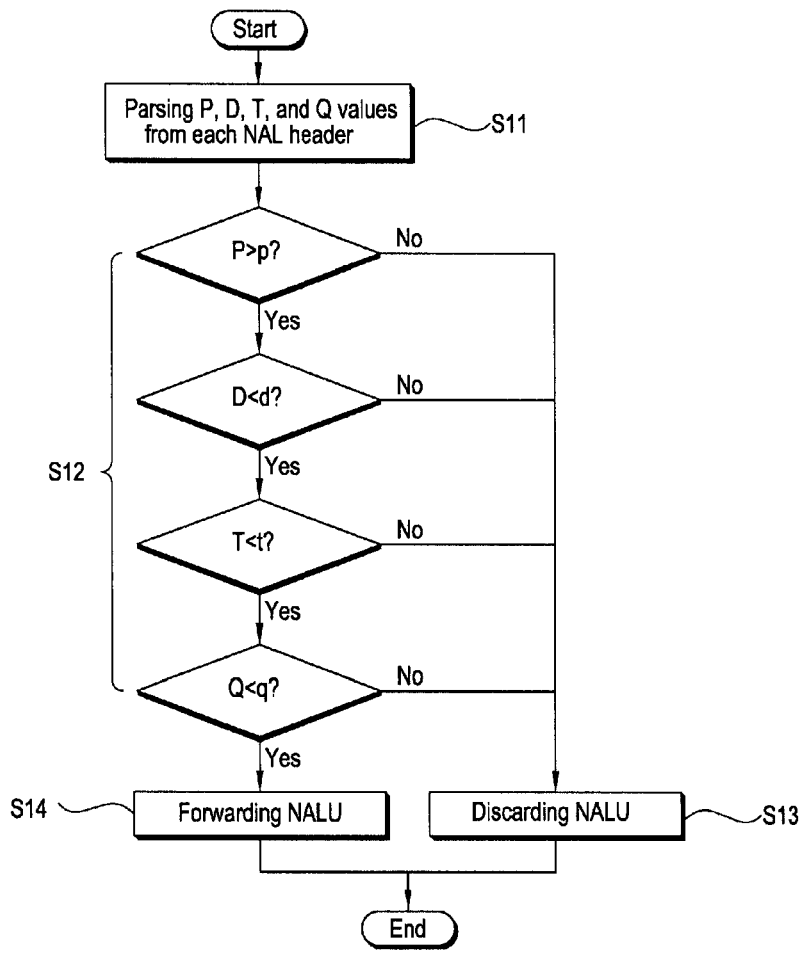
[Fig. 4]
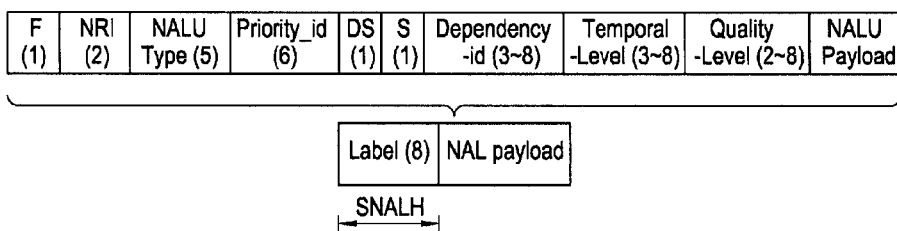
[Fig. 5]
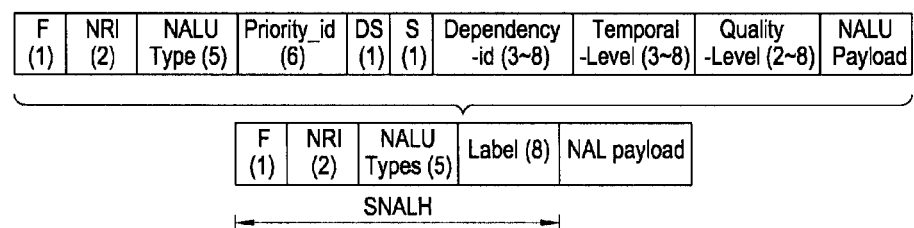

[Fig. 6]
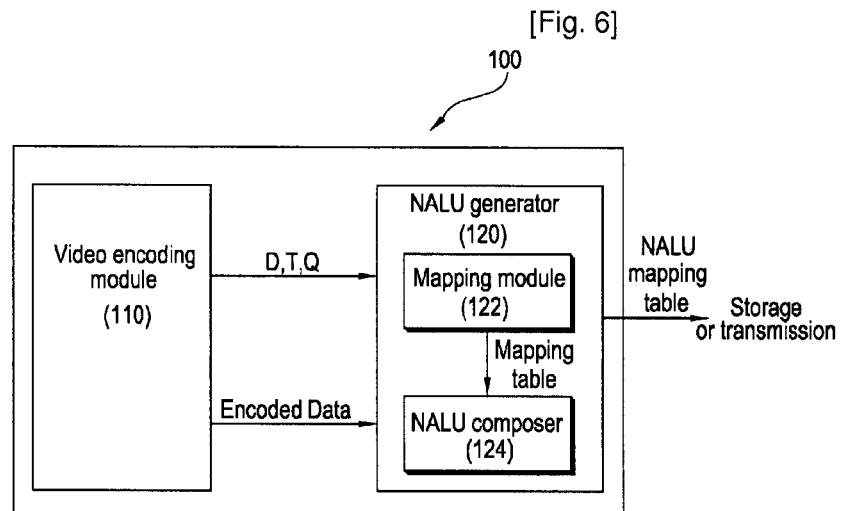
[Fig. 7]
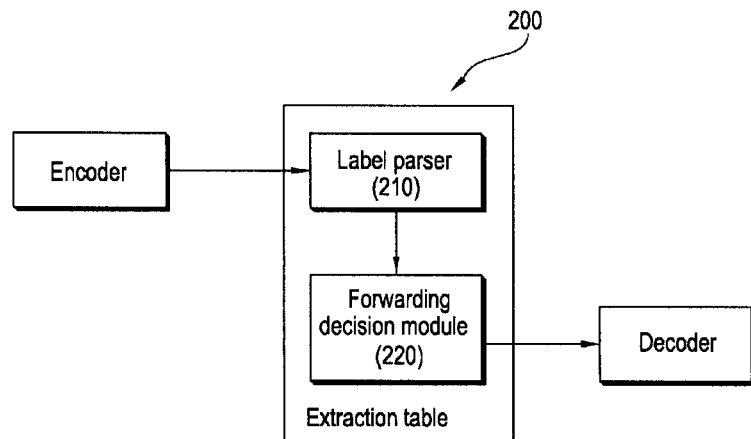
[Fig. 8]
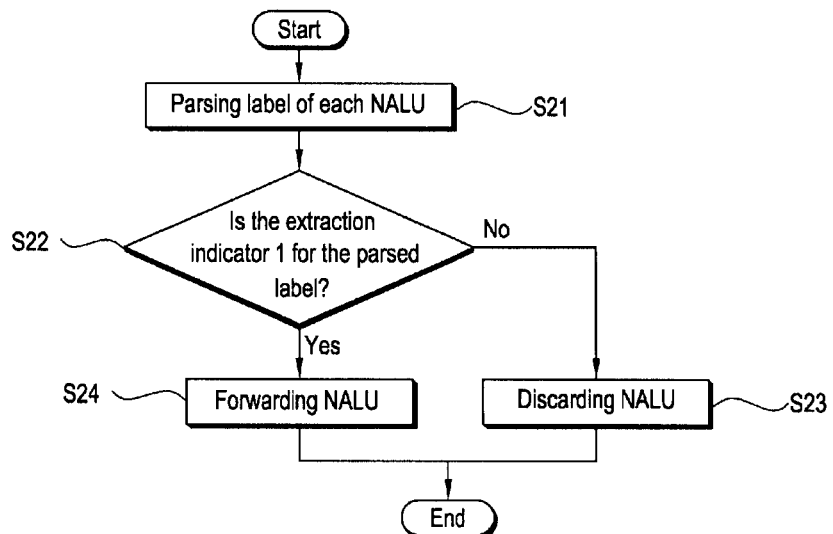

[Fig. 9]

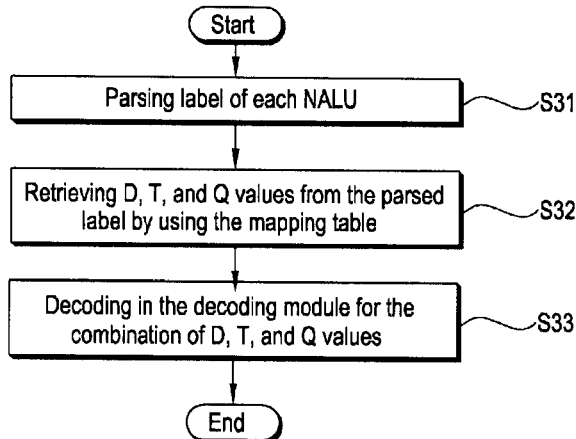

[Fig. 10]

| NAL Unit Type | Content of NAL unit | NRI(binary) | Label |
| --- | --- | --- | --- |
| 1 | non-IDR coded slice | 10 | 0100 0001B |
| 2 | Coded slicw data partition A | 10 | 0100 0010B |
| 3 | Coded slicw data partition B | 01 | 0010 0011B |
| 4 | Coded slicw data partition C | 01 | 0010 0100B |
| 5 | IDR slices | 11 | 0110 0101B |
| 6-13 | control data | 11 | 0110 ????B |
| 19 | auxiliary slices | 01 | 0011 0011B |
| 20(21) | SVC IDR(SVC non-IDR) | 10(or 00) | other labels |
| Others | unspecified or reserved | ......................... | |

[Fig. 11]

```
Switch(label) {
        case 0100 0001B: Process non-IDR coded slice;
        case 0100 0010B: Process slice of data partition A;
        case 0010 0011B: Process slice of data partition B;
        case 0010 0100B: Process slice of data partition C;
        case 0110 0101B: Process IDR slices;
        case 0110 ????B: Process control data;
        ...........................................
        case 0111 1010B: Process SVC layer with DTQ = 'dtq';
        ...........................................
}// end of switch
```

[Fig. 12]
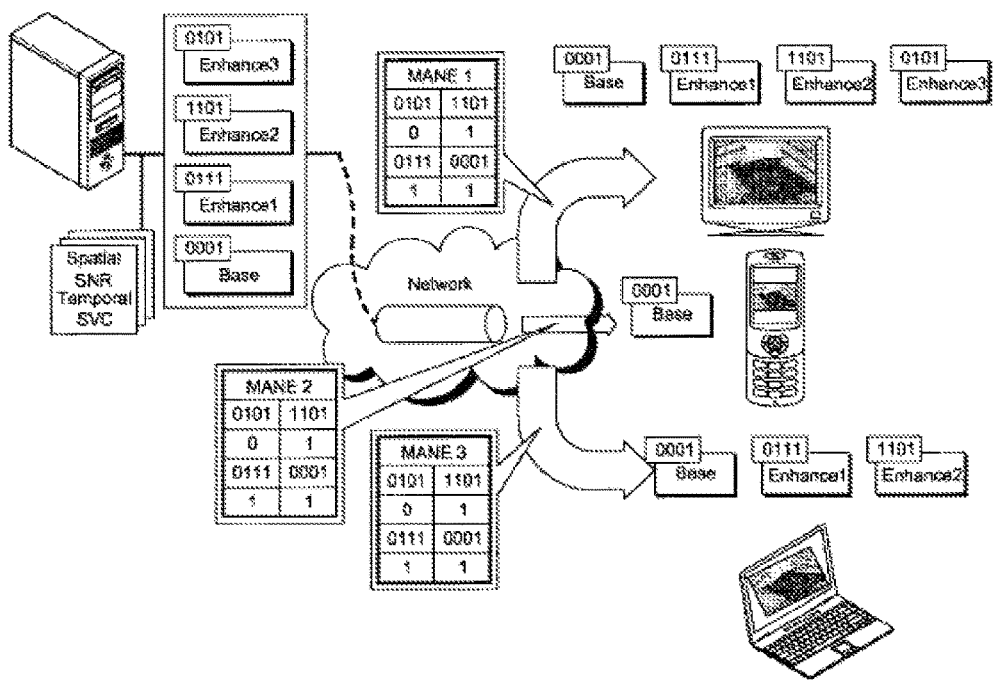
[Fig. 13]
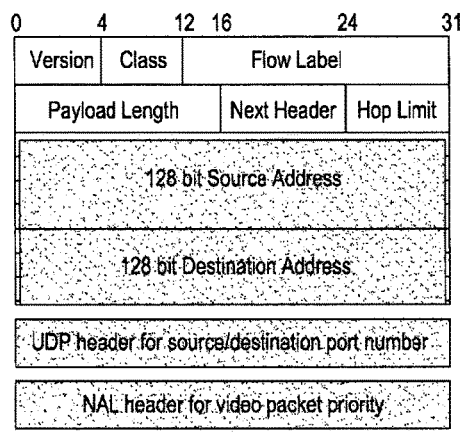

[Fig. 14]
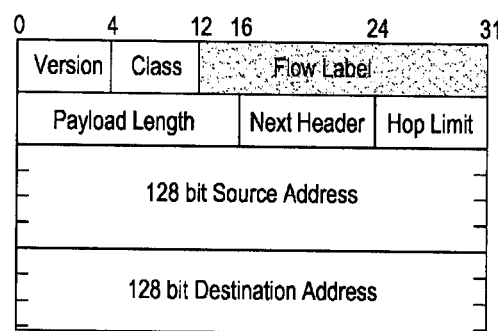
[Fig. 15]
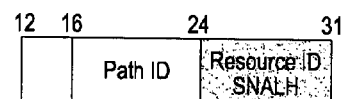

ns a figure showing# PACKET FORMAT OF NETWORK ABSTRACTION LAYER UNIT, AND ALGORITHM AND APPARATUS FOR VIDEO ENCODING AND DECODING USING THE FORMAT, QOS CONTROL ALGORITHM AND APPARATUS FOR IPv6 LABEL SWITCHING USING THE FORMAT

CROSS-REFERENCE TO RELATED APPLICATIONS

This Application is a Continuation of application Ser. No. 16/908,845 filed on Jun. 23, 2020. Application Ser. No. 16/908,845 is a continuation of application Ser. No. 15/827,596 filed on Nov. 30, 2017. Application Ser. No. 15/827,596 is a continuation of application Ser. No. 14/477,252, filed Sep. 4, 2014, which is a continuation of application Ser. No. 12/295,805, filed Oct. 2, 2008, which is the National Stage of International Application No. PCT/KR2008/000203, filed on Jan. 11, 2008, which claims the priority of Korean Application No. 10-2007-0003809, filed on Jan. 12, 2007, Korean Application No. 10-2007-0005162, filed Jan. 17, 2007 and Korean Application No. 10-2007-0007119, filed Jan. 23, 2007. The contents of the aforementioned applications are hereby incorporated by reference in their entirety.

TECHNICAL FIELD

This invention relates to video codec, more specifically, to a method of composing a packet for each MPEG video network abstraction layer unit (NALU) and its using video codec, QOS control based on IPv6 label switching, and decoding algorithm and apparatus.

BACKGROUND ART

Scalable video coding (SVC) and multi-view video coding (MVC) currently standardizing in MPEG/JVT (Joint Video Team) are based on H.264/AVC. The NALU format of H.264/AVC is used for packetization of encoded bitstream.

FIG. 1 shows conceptual structure of video coding layer (VCL) and network abstraction layer (NAL). As shown in FIG. 1, H.264/AVC is composed of the VCL w hich encodes moving pictures and the NAL which connects the VLC to lower system to transmit and store the encoded information. Independently of the bit stream generated by the VLC, there are sequence parameter set (SPS), picture parameter set (PPS), and supplemental enhancement information (SEI) for timing information for each picture, information for random access, and so on.

FIG. 2 is a block diagram which shows the NALU format proposed in the standard SVC. As shown in FIG. 2, a NALU includes a NAL header (NALH) and NAL payload. A NALH is 3-5 byte long and includes information about NAL type, layer identification information of video data in the payload (priority, spatial scalable level, temporal scalable level, and quality scalable level). The NAL type field includes F field, NRI (nal_ref_idc) indicating whether it is referenced picture or not, and indicator of NALU type. The layer identification information field includes priority field (P), dependency_id field (D) for spatial scalable level, temporal level field (T), and quality scalable level field (Q).

The same NALU format used in the SVC as in FIG. 2 is also used for the MVC. Instead of the layer identification information, view identification information is included.

According to the NALU format of the current SVC and MVC, all the layer identification information and the view identification information should be parsed to identify layer or view number. Especially, in order to identify layer in the SVC, 2-4 byte long layer identification information should be parsed into P, D, T, and Q values, so that this processing imposes burden to processors and increases cost of system.

The NALH has layer identification information, which the routers in the network including the IPv6 routers are not expected to parse. For as shown FIG. 13, the NALH is located in the payload of an IP packet. It is required to put the information into IP header which is read by the routers. The method how to render label has not been standardized yet. If one can identify packet priority, QoS (Quality of Service) control becomes easier so that upon congestion, less important packets can be discarded.

FIG. 3 shows procedure to identify layer of arbitrary NALU by parsing whole NALH according to the NALU format of the conventional SVC standard so that it is a flow chart to show for the MANE (media aware network element) to decide whether it forwards or discards each NALU.

The MANE in FIG. 3 parses P, D, T, and Q values (S11) from each NALU (which is generated by the encoder or transmitted over wired or wireless networks) and, then, parsed P, D, T, and Q values are compared to pre-defined values (p, d, t, q) in order for the MANE to decide whether it forwards or discards each NALU (S12). If any one of the value does not meet the requirement, the NALU is discarded (S13) while the NALU which satisfies all requirements is extracted and forwarded to the decoder (S14).

Burden of processors during extraction process of NALUs is applied to the decoding process in the same way so that the decoder parses P, D, T, and Q values from every NALU delivered through wired or wireless networks or stored. The values are evaluated if the layer of the NALU is included in layers which the decoder is to decode. Only when the values satisfy the requested setting points, the NALU is decoded, otherwise the NALU is discarded.

DISCLOSURE OF INVENTION

Technical Problem

This invention provides solutions to the tasks to reduce burden for the MANE and the decoder to decide whether to extract/decode NALU by parsing long NALH, and to provide a method of composing NALU to extract/decode with less complexity and its using decoding algorithm, and QoS control algorithm for IPv6 label switching, and decoding algorithm, and apparatus herein.

This invention also provides solution to the tasks for composition method of IPv6 packets which enables to control QoS effectively without parsing NALH in the IPv6 routers, and routing and QoS control algorithm for IPv6 label switching.

Technical Solution

In order to solve the tasks described above, according to an embodiment of the present invention, by contracting NALH standardized in JVT for SVC and MVC into label of a certain size, encoding, extracting, and decoding are performed based on SNALH(Shortened NALH). As described before, conventionally every NALU has 3-5 byte long NALH to identify layer (priority, spatial scalable level, temporal scalable level, and quality scalable level), and view number. Therefore, in the SVC, NALH includes priority field (P), dependency_id field (D) for spatial scalable level, temporal level field (T), and quality scalable level field (Q). According to the NALH format of the SVC, all the NLAU's have P, D, T, and Q values in the NALH.

According to an embodiment of the present invention, this long NALH for every NALU is replaced by the SNALH which includes a pre-defined short label identifying layer identification information (for example, P, D, T, and Q values). The short labels for layer identification are defined for a certain service or a certain video sequence. According to an embodiment of the present invention, if the SNALH is 1 byte long, about 250 different types of NALU streams can be identified.

If an embodiment of the present invention is applied to the SVC, layer of each NALU can be identified. For example, if the SNALH is 1 byte long, about 250 different compositions of P, D, T, and Q values for different NALU streams can be identified. In the same way, if an embodiment of the present invention is applied to the MVC, view number of each NALU can be identified Moreover, according to NALU extraction procedure for the conventional format of NALH, every NALU can be processed after parsing relatively long NALH and comparing 4 layer identification information fields. However, according to an embodiment of the present invention, the MANE located along the path between the encoder and the decoder can decide whether discard or forward each NALU by just parsing a label from a short SNALH. According to an embodiment of the present invention, the decoder also can decide whether discard or decode each NALU by just parsing a label from a short SNALH. Therefore, according to an embodiment of the present invention, extraction and decoding processes of SVC or MVC NALU's become much simpler. Especially, since NALU's are extracted in the MANE within networks, it is desirable to simplify the process as much as possible.

In addition, the NAL format as an embodiment of the present invention is useful to apply to IPv6 networks. For example, if the SNALH as an embodiment of the present invention is inserted in the IPv6 packet header or so, the IPv6 routers can control QoS (Quality of Service) just by reading the inserted SNALH instead of reading NALH of NALU. As an embodiment of the present invention, the SNALH can be placed in 20 bit flow label in the IPv6 packet header. By using the SNALH in the flow label, the IPv6 routers can effectively perform the functions of MANE assumed by MPEG JVT. In this case, the conventional NALH can be kept unchanged for backward compatibility to the current NALH standard.

In order to solve the task describe above, according to an embodiment of the present invention, the method to compose a NALU is determined by including NALH with label to indicate priority of encoded data and, also including NAL payload of encoded data. The label described above is determined based on a combination priority of encoded data, spatial scalable level, temporal scalable level, and quality scalable level.

As another point of view of above-mentioned embodiment, the SNALH can be used to include a field to indicate type of NALU. The SNALH, also can be used to indicate priority of encoded data, spatial scalable level, temporal scalable level, and quality scalable level in more detail.

In order to solve the task described above, video encoding method as above-mentioned embodiment includes steps of encoding input sequences into bitstreams of multiple layer according to information about layer structure, mapping a label to each of multiple encoded bitstream according to information about layer structure, inserting the label into NALH as SNALH, generating NALU by merging SNALH and NAL payload. For each bitstream, the information about layer structure indicates a combination of priority of encoded data, spatial scalable level, temporal scalable level, and quality scalable level.

As one side of above-mentioned embodiment, a mapping table can be used during the mapping step in order to map a label to a combination of priority of encoded data, spatial scalable level, temporal scalable level, and quality scalable level.

In order to solve the task mentioned above, as a method to process NALU in the decoder including multiple decoding modules, the NALU mentioned above is parsed into the SNALH with label and NAL payload, and according to the label the decoder mentioned above decides which decoder module among the decoder modules described above processes the NAL payload. At this time, the label mentioned above can have information to indicate a combination of priority of encoded data, spatial scalable level, temporal scalable level, and quality scalable level.

In order to solve the task mentioned above, as a method for a node in the middle of network to decide whether to forward packet of the NALU according to the layer information of the encoded data, the packet of the NALU is composed of the SNALH with label to indicate layer information and NAL payload, the node parses the label mentioned above and decide whether to forward the packet according to the parsed label mentioned above, and the label indicates a combination of priority of encoded data, spatial scalable level, temporal scalable level, and quality scalable level.

As one side of above-mentioned embodiment, the node in the middle of network can be the MANE assumed in the MPEG-JVT standards. The node decides whether to forward each packet of the NALU according to the extraction map, the extraction map mentioned above can include information about extraction policy conditional to the label mentioned above. Information, whether to forward or not, can be expressed by 1 bit. The condition mentioned above includes at least one of network condition including channel condition, terminal condition, and user preference. The extraction map can be delivered in either the beginning of the middle of service.

As another side of above-mentioned embodiment, the nodes in the middle of network can be IPv6 routers with the IPv6 protocol, the above-mentioned packets can be IPv6 packets, and the label can be inserted into the flow label in the IPv6 packet header.

Advantageous Effects

Effects of an embodiment of the present invention are as follow,

Firstly, in the middle of network, processing complexity and processing time for QoS control can be reduced. When the nodes in the middle of network (for example, MANE) are to discard NALU's according to network condition, according to an embodiment of the present invention, instead of parsing long NALH to identify the layer of NALU, by using the extraction map and a label parsed from the SNAH of each packet, they can decide whether to forward or discard each packet adaptively network condition. The extraction map can be set in the beginning of service, or one generated by the MANE regarding to various extraction conditions. The extraction map can be sent by the server or generated in the MANE.

Secondly, complexity of the decoder can be reduced. Once reference relationship between layers or views is constructed in the beginning of service or is reconstructed upon change of the relationship, the decoder does not have to parse long NALH with size of 2-4 bytes, but, it just parses 1 byte long SNALH. If a payload in a NAL is stored in the decoder buffer of any layer or view according to NALH, the following processes are the same as normal.

Thirdly, the short label can be used in the lower network protocol layers. By using the label, network can provide predefined level of QoS for the flow. For example, the label with or without modification can be inserted the flow label in IPv6 header. The label in SNALH as an embodiment of the present invention can also be used in MPLS (Multi-Protocol Label Switching).

Fourthly, bitrate can be reduced. As an embodiment of the present invention, if label-type header (SNALH) is one byte long, 2-4 bytes per NALU can be reduced.

BRIEF DESCRIPTION OF THE DRAWINGS

FIG. 1 is a conceptual diagram of relationship between VCL (Video Coding Layer) and NAL (Network Abstraction Layer) as in the H.264/AVC standard.

FIG. 2 is a block diagram to show the NALU format proposed in the current SVC standard.

FIG. 3 is a block diagram to show the conventional procedures to decide whether to forward a NALU (or a packet of a bitstream) in the MANE.

FIG. 4 is a block diagram for NALU format as the first embodiment of the present invention.

FIG. 5 is a block diagram for NALU format as the second embodiment of the present invention.

FIG. 6 is a block diagram for the SVC decoder structure as an embodiment of the present invention.

FIG. 7 is a block diagram for the MANE as an embodiment of the present invention. The MANE decides whether to forward a NALU (or a packet of a bitstream).

FIG. 8 is a block diagram for the procedures which are procedures for the MANE to decide whether to forward a NALU (or a packet of a bitstream) in the MANE as an embodiment of the present invention.

FIG. 9 is a flow chart for the decoder to parse NALU's of the format defined in FIG. 4 or 5.

FIG. 10 shows an example to map 14 NALU types in the H.264/AVC standard into 14 labels.

FIG. 11 shows a peusdo-code to decode according to labels parsed out of the format defined in FIG. 4 or 5.

FIG. 12 shows how to multicast video stream in heterogeneous network.

FIG. 13 shows how much data should be read for packet switching by using IPv6 protocol.

FIG. 14 shows how much data should be read for label switching according to an embodiment of the present invention.

FIG. 15 shows an example of the flow label in IPv6 header as an embodiment of the present invention.

BEST MODE FOR CARRYING OUT THE INVENTION

An embodiment of the present invention is explained in detail by using attached figures as follows.

FIG. 4 is a block diagram for NALU format as the first embodiment of the present invention. In FIG. 4, upper part shows the conventional NAL format while the lower part shows NALU format as the first embodiment of the present invention.

According to FIG. 4, the NALU format as an embodiment of the present invention includes SNALH(label type NALH) and NAL payload. Among them, NAL payload is the same as that in the conventional format. Therefore, as an embodiment of the present invention, the conventional NALH in a NALU is replaced by SNALH by using a certain size of label. This SNALH can be one byte long in which case number of possible labels is 28=256 or so.

In more detail, as an embodiment of the present invention, a combination of NAL type, Priority_id for priority, Dependency_id for spatial scalable level, Temporal_level for temporal scalable level, and Quality_level for quality scalable level which the conventional NALH includes, represents a set among NALH sets of limited number, and is converted into a label to discern the sets. That is, as an embodiment of the present invention, a set of NALH's with the same combination is mapped into a label one by one basis. Therefore, one unique label is assigned to any combination of NAL type, Priority_id for priority, Dependency_id for spatial scalable level, Temporal_level for temporal scalable level, and Quality_level for quality scalable level.

Like this, as an embodiment of the present invention, SNALH in NALU includes a label corresponding to various values in the conventional NALH. This embodiment of the present invention is based on the fact that finite number of NALH sets exists during a video session or stored video sequence, and the same number of labels is used in the SNALH. For example, if number of NALH sets is less than 250, the conventional NALH can be replaced by 1 byte long SNALH.

FIG. 5 is a block diagram for NALU format as the second embodiment of the present invention. In FIG. 5, upper part shows the conventional NAL format while the lower part shows NALU format as the second embodiment of the present invention.

According to FIG. 5, the NALU format as an embodiment of the present invention includes NALU type, SNALH(label type NALH) and NAL payload. Among them, NAL payload is the same as that in the conventional format. Therefore, as an embodiment of the present invention, the conventional NALH in a NALU is replaced by SNALH by using a certain size of label. This SNALH can be one byte long in which case number of possible labels is 28=256 or so.

In more detail, as an embodiment of the present invention, at first, NALU type field in the conventional NALU format is unchanged. And, a combination of NAL type, Priority_id for priority, Dependency_id for spatial scalable level, Temporal_level for temporal scalable level, and Quality_level for quality scalable level which the conventional NALH includes, represents a set among NALH sets of limited number, and is converted into a label to discern the sets. That is, as an embodiment of the present invention, a set of NALH's with the same combination is mapped into a label one by one basis. Therefore, one unique label is assigned to any combination of NAL type, Priority_id for priority, Dependency_id for spatial scalable level, Temporal_level for temporal scalable level, and Quality_level for quality scalable level.

Like this, as an embodiment of the present invention, SNALH in NALU includes a label corresponding to various values (P, D, T, Q) in the conventional NALH. This embodiment of the present invention is based on the fact that finite number of NALH sets exists during a video session or stored video sequence, and the same number of labels is used in the SNALH. For example, if number of NALH sets is less than 250, the conventional NALH can be replaced by 1 byte long SNALH.

And according to the format in FIG. 4 or 5, one-to-one mapping of a label of SNALH and a NALH set which is a combination of P, D, T, and Q values can be defined in a mapping table. The decoder and encoder have the same mapping table. There is no constraint how to have the same mapping table. For example, the encoder may send the mapping table with encoded video data to the decoder, or the encoder may send only information about the mapping table to the decoder. In the latter case, the encoder and decoder are expected to have several mapping tables already, and the encoder sends an identifier to identify a table, and the decoder retrieves the mapping table identified by the identifier among the mapping tables.

The method for the encoder and decoder to use the mapping table is as follows. For example, by using the mapping table, the encoder generates a NALU with a label, as in the format mentioned in the first or second embodiment of the present invention. Then, the decoder identifies scalable layer of a NALU by using the mapping table and the label in the NALH. The remained payload is sent to the decoder module appropriate to the layer identified by the label.

FIG. 6 is a block diagram for the SVC decoder structure as an embodiment of the present invention. In the following, although the present invention is explained by using the case of the SVC standard, it is obvious for person in the art that the embodiment of the invention can be applied to the other type of encoder (for example, MVC encoder).

In FIG. 6, the SVC encoder 100 includes the video encoding module 110 and the NALU generator 120. Even though the video encoding module 110 and the NALU generator 120 are depicted as separate modules in FIG. 6, they are separated logically according to their functions, but they could be implemented either separately or in one body. And, even though only the video encoding module and the NALU generator are included in FIG. 6, the other modules in the SVC encoder are omitted because they are irrelevant to the explanation.

The video encoding module is used to perform encoding processes (transformation and quantization, etc.) to generate encoded data from original image, satisfying the SVC standard. The SVC encoding module includes the base layer encoding module, and multiple enhanced layer encoding modules. As result of encoding, the video encoding module, also, generates information representing NAL type, Dependency_id (D) for spatial scalable level, Temporal_level (T) for temporal scalable level, and Quality_level (Q) for quality scalable level.

The NALU generator is a module to generate NALU by using information about NALU type, D, T, and Q given by the video encoding module. At this time, priority of NALU can be defined. More than one priority can be defined for a combination of D, T, and Q. The NALU generator 120 can generate NALU in the format depicted in FIG. 4 or 5. For this, the NALU generator includes NALU generator 120, mapping module 122, and NALU composer 124.

The mapping module 122 is used to decide a label for SNALH according to P, D, T, and Q values. In order to decide a label, the mapping module 122 uses a stored mapping table or that produced conditionally for a video sequence or a video session. And, the NALU composer 124 composes a NALU by using encoded data provided by the video encoding module 110 and label given by the mapping module 122 as depicted in FIG. 4 or 5. Generated NALU is sent or stored in storage with or without the mapping table (or information to identify a mapping table).

FIG. 7 is a block diagram for the MANE (media aware network element) as an embodiment of the present invention. The MANE includes the NALU extractor (packet extractor or bitstream extractor) which decides whether to forward a NALU (or a packet of a bitstream). The NALU extractor mentioned above is located in the middle of network. And the NALU extractor extracts and forwards NALU's which satisfy a certain condition (among all layers in an SVC, certain layers requested by the receiver). In FIG. 7, the NALU extractor 200 as an embodiment of the present invention includes the label parser 210 and the forwarding decision module 220.

The label parser 210 parses a label from a NALU (with the format in FIG. 4 or 5) received from the encoder. Therefore, as an embodiment of the present invention, the label parser 210 does not need to parse information of NAL type, Dependency_id(D) for spatial scalable level, Temporal_level(T) for temporal scalable level, and Quality_level (Q) for quality scalable level.

The forwarding decision module 220 decides whether to forward each NALU or not based on its extraction table and the label parsed by the label parser 210. The extraction table is a table of labels with which bitstreams (NALU's) are allowed to be forwarded. Therefore, the extractor which is an embodiment of the present invention, does not need to parse P, D, T, and Q values of each NALU, but, by using only a label and the extraction table, can decide whether to forward corresponding NALU or not. For each label, information about forwarding or not can be indicated by a bit.

The extraction table can be received from the server or can be constructed in the NALU extractors (for example, MANE). Labels in the extraction table may correspond to those in the mapping table in the encoder. According to various conditions of network, the terminal, and/or the user, more than one extraction table may be used. Moreover, for a multicast session, different NALU extractors can be used in different branches in the network.

FIG. 8 is a block diagram for the procedures in the MANE as an embodiment of the present invention. They are procedures for the MANE to decide whether to forward a NALU (or a packet of a bitstream). As in FIG. 8, the NALU extractor parses a label from each received or retrieved NALU. And, it sees if the extraction indicator for the parsed label value is '1' in the extraction table (S22). Here, if the extraction indicator is '1', the corresponding NALU is forwarded while if the extraction indicator is '0', the corresponding NALU is discarded. Therefore, as an embodiment of the invention, the corresponding NALU is discarded in Step S23, while in Step S24 the corresponding NALU is forwarded to the following network entity for the decoder.

FIGS. 7 and 8 show the apparatus and method of NALU extraction in the entities in the middle of network. Normally, however, media data is transmitted over certain wired and wireless networks as stream of packets, or just bitstream differently from stream of NALU's. In this case, the above mentioned labels can be included in packet headers or in bitstream. And, the network entities such as the MANE's parse labels out of packet headers or bitstream to decide whether to forward or not.

FIG. 9 is a flow chart for the decoder to parse NALU's of the format defined in FIG. 4 or 5. In FIG. 9, the decoder parses (S31) a label from each NALU received from transmission network or retrieved from stored contents. For example, the decoder reads label values by parsing SNALH in NALU. And, the decoder sees (S32) D, T, and Q values corresponding to the parsed label value by using the mapping table mentioned above. The mapping table can be received with NALU's or can be already stored in the decoder. And, the decoder forwards NAL payload to a video decoding module corresponding to the D, T, and Q values. Each video decoding module decodes(S33) incoming encoded data, that is, the NAL payload.

As another embodiment of the present invention, the decoder may have another NALU extractor explained in FIG. 7 in addition to decoding modules. In this case, the decoder decodes only NALU's allowed by the NALU extractor.

Hereinafter, above-described embodiments of the present invention are explained in various view points.

<NALH Compression Method>

During a video session temporarily, or when a video sequence is stored, each 3-5 byte long NALH as in the JVT standard is mapped and replaced by a SNALH(Shortened NALH). The same mapping table is used in the encoder and the decoder. When an encoded video sequence is stored, the mapping table is, also, to be stored.

As an embodiment of the present invention, in order to control QoS adaptively, the MANE should have the extraction table for extracting dependently on labels of NALU's. The extraction table can be received from the server or the client, or can be constructed in the MANE by itself. If the MANE by itself constructs an extraction table, it should have the above-mentioned mapping table. In the NALU format according to an embodiment of the present invention, a set of P, D, T, and Q values are replaced by a label if a video session or a stored video sequence is composed of finite NALU sets of the same P, D, T, and Q values. For example, the number of sets is less than 250, the indicator for each set can be compressed into 8 bits.

For example, suppose that a video sequence is encoded with 3 spatial scalable layers, each of which is scaled into 2 temporal scalable layers, each of which is scaled into 4 quality layers. Then, there are 24(3×2×4) different layers, which can be identified by 24 different labels.

If a layer is composed of two streams of NALUS with different priority_ID's, the layer needs 2 different labels. Here, 'a stream of the same layer' means stream of NALU's with the same dependency_ID, temporal_level, and quality_level (DTQ in short). To the contrary, if a P value is used for different DTQ sets, each set should have its own label.

The encoder and the decoder should have the mapping table between labels and DTQ sets. Even though labels can be constructed arbitrarily, if possible, it is better to make labels to indicate DTQ values of the H.264/AVC standard without the mapping table.

1 Byte Long SNALH

During a video session temporarily, or when a video sequence is stored, if number of layers (or sets of NALH's) is finite, the same number of labels is determined and used as SNALH's. According to an embodiment, under assumption that the number is less than 250, NALH can be compressed into 8 bits. An embodiment of 1 byte long SNALH is shown in FIG. 4.

2 Byte Long SNALH

In order to keep compatibility to the H.264/AVC standard, the first byte is the same as that in the standard at the moment of January 2006. The remained NALH bytes are compressed into a byte long label. An embodiment of 2 byte long SNALH is shown in FIG. 5.

Extended Usage of SNALH

'Extended usage of SNALH' means to use SNALH in various purposes differently from above-mentioned embodiment of the present invention. There are 'NALH extension,' 'scalable methodology extension,' 'media extension,' and 'protocol extension.'

'NALH extension' method keeps the conventional NALH format and adds the SNALH. That is, in FIGS. 4 and 5, label is attached in the front of the conventional NALU with full NALH. According to this method, even though NALH becomes larger by adding SNALH, one can enjoy merits of SNALH in reduction of complexity in the decoder and the MANE.

'Scalable methodology extension' means to allow more combinations of DTQ than those of the conventional standard. Since D, T, and Q are represented by 3, 3, and 2 bits in the conventional standard, numbers of possible layers are 8, 8, and 4, respectively. According to an embodiment of the current invention, since labels are defined by the mapping table, number of layers can be freely extended if the entities engaged in a service agree together.

'Media extension' means to apply the labels proposed by an embodiment of the current invention to media streams other than video streams such as audio stream. In an MVC (Multi-View Video Coding) session, labels can be assigned to views. In addition, labels can be assigned to streams of FEC(Forward Erasure Correction) packets for individual views or layers. If network is packet-lossy, parity packet streams are forwarded, while they are discarded in loss-free network.

'Protocol extension' means to apply the above-mentioned labels to other protocols with or without slight modification. As an embodiment, SNALH in FIG. 4 or 5 can be copied into 20 bit long flow label in IPv6 header as well as into label field in MPLS.

Method to Guarantee Compatibility to H.264/AVC

The SNALH in FIG. 5 is compatible to the H.264/AVC standard. The SNALH in FIG. 4 becomes compatible to the H.264/AVC standard, if only 14 labels are used as shown in FIG. 10. If NRI and F values are fixed for 14 NAL types related to H.264/AVC, 14 labels are determined. Therefore, labels other than above-mentioned 14 labels should be used for streams other than SVC streams.

Compatibility to SEI Messages

Scalability_info and layer_ID delivered by using SEI (Supplemental Enhancement Information) message can be used as labels. In this case, the encoder and the decoder do not need another labels.

<Implementation of the Encoder>

The decoder should be informed of the information that the encoder uses the SNALH. The information can be informed by using SPS(Sequence Parameter Set). In case of storing the encoded sequence, this information that the SNALH is used should be stored.

Storing and Transmitting the Label Mapping Table

Labels are assigned as many as number of streams (sets of NALU's) discerned in a video sequence. Relationship to map streams to labels is constructed as the mapping table. The mapping table is constructed to assign all or partial sets of NALH's to labels. As an embodiment, this information can be delivered to the decoder by using control data such as SPS or PPS (Picture Parameter Set). As an embodiment, labels can be serial number for layers of SVC or views of MVC.

Generation of NALU

In every NALU, the conventional long NALH is replaced by the SNALH.

<Implementation of the Decoder>

The decoder should be informed of the information that the encoder uses the SNALH. The information can be informed by using SPS. In case of playing the encoded sequence, this information that the SNALH is used should be read and properly parsed.

Constructing the Label Mapping Table

During decoder initialization period, the mapping given by the encoder is read. The decoder initializes the video decoding modules as many as number of streams to be decoded, and sets up relationship to labels respectively. At this moment, referencing relationship between SVC layers and MVC views, is also established.

NALU Processing

Upon receiving a NALU, the decoder parses the SNALH as in FIG. 4 or 5, and stores the payload of the NALU is stored in the buffer of the corresponding decoding module. In the conventional standard, since decision of decoding module becomes possible after parsing and evaluating D, T, and Q values, it is much more complex than that of the present invention. The algorithm for the decision is depicted in FIG. 11. FIG. 11 shows that the decoder can deliver the payload to the proper decoding module just by evaluating a single label in the SNALH, but not by using multiple values such as D, T, and Q of the conventional NALH.

<Implementation of the MANE(Media Aware Network Element)>

According to an embodiment of the present invention, when the MANE decides which streams it forwards, it depends on its extraction table. Therefore, according to an embodiment of the present invention, the MANE does not need to evaluate P, D, T, and Q values, but it decides whether to discard or not by using 1 bit information for every label in the extraction table. This extraction table is received from the server or the client, or is generated in the MANE. The MANE may have more than one extraction table as many as differentiable conditions of network, terminals, and users. For a multicast session, different extraction tables are placed in the network branches as shown in FIG. 12. FIG. 12 shows that 3 MANE's have 3 different extraction tables, respectively. It is an example. For simplicity, labels are denoted as 4 bit long values and there are 4 different streams. For example, in MANE3, NALU's with Label 0101 are discarded while NALU's with Labels 1101, 0111, and 0001 are forwarded.

Construction of the Extraction Table

The MANE receives information that the server uses the SNALH during initialization period of a video session. In order to construct an extraction table, the MANE may receive it from the server or the client, or may generate the extraction table by itself by using control information received from intelligent routers or the base station of wireless network. Types and range of layers or views to be forwarded are determined by the user's preference, terminal capability, and network condition. The terminal capability includes display resolution and allowable channel bandwidth. Even during a service session, the extraction policy in the extraction table can be modified adaptively to time varying user's preference, terminal capability, and network condition. It is desirable that this decision policy is received from the server. The server may send a modified extraction table to the NAME.

As an example in FIG. 12, in case that there are 4 labels for 4 different layers, the server sends 1111 to MANE1 on the way to HDTV terminals so that NALU's of all labels are forwarded, while the server sends 0001 to MANE2 on the way to mobile phones so that only NALU's with Label 0001 corresponding to the lowest layer, that is, Base layer are forwarded. At the same time, the server sends 0111 to MANE3 on the way to laptop computers so that NALU's of 3 lowest labels are forwarded. According to an embodiment of the present invention, bit '0' or '1' value of the most significant bit indicates whether NALU's with the highest label is forwarded or not, and so on.

It is desirable that the server sends a modified extraction table if the client requests to change service level during the service session. It is desirable that the MANE modifies the extraction table if channel(or network) condition is changed to certain amount. However, if the MANE is not intelligent enough to perform modification, the server or the client monitoring channel condition (available bitrate, packet loss ratio) sends a modified extraction table to the MANE.

Extraction Procedure

If the SNALH is used, the MANE decides extraction based on labels in the SNALH. However, this approach causes L3 (network layer) routers burden that they deal with application layer such as video data, and hurts the principle of independency between protocol layers. Therefore, it is desirable to insert the above-mentioned label into the flow label in the IPv6 header so that the routers only evaluate IP headers for decision of extraction.

FIGS. 3 and 8 compare extraction decision procedures between the conventional method and an embodiment of the present invention. As shown in FIGS. 3 and 8, conventionally NALU extraction is decided based on 4 values, while it is decided based on only a label in the present invention.

In more detail, for SVC if the conventional method is used as shown in FIG. 3, 4 values(P, D, T, and Q) are parsed and used for 4 steps of extraction decision, while if the method of the present invention is used as shown in FIG. 8, regardless of meaning of value, the MANE mechanically decides extraction based on one value, that is, the label of every NALU. In FIG. 8, Step S22 is an example to use the function B=map[label1] to decide extraction, so that if the value 'B' is 1, the NALU's with Label 1 are forwarded, while the value 'B' is 0, the NALU's with Label 1 are discarded OoS Control for IPv6 Label Switching When we transmit video data encoded by using MPEG-2 or H.264, significance of video packets is different from each other. In order to control quality of video service effectively, one should discern difference of significance of video packets. The IPv6 routers discern the difference in two different modalities such as packet switching modality and label switching modality. As for packet switching case, the routers should read 5 turples such as destination address, source address, destination port number, source port number, and protocol in order to select pre-defined service policy of corresponding packet. 5 turples are shown as shaded region in FIG. 13. It makes the processing time of every packet long, and hurts the independency principle between network protocol layers. For port numbers are issues of the transport layer.

According to an embodiment of the present invention, label switching is used to eliminate the problem. During initialization period of a session, temporary labels are assigned, and they are used only for the session. The label is inserted in the flow label which is shaded region in FIG. 14. According to the method, IPv6 is able to tell the session that every packet is included in and significance of every packet by evaluating only the flow label in the IPv6 header. This method resembles the packet routing (or switching) method of ATM (Asynchronous Transfer Mode) or MPLS (Multiple Protocol Label Switching).

Label in label switching includes both path information and resource information for every packet stream. After call setup, path and significance of every packet is identified by using the label. The conventional packet switching requires the router to read about 600 bits (including IPv6 header and video layer header) while according to an embodiment of the present invention, it is possible the router to identify path and significance by evaluating 20 bit long flow label.

FIG. 15 shows an example of the flow label in IPv6 header as an embodiment of the present invention. According to FIG. 15, 8 bit long path identifier is inserted from the 5th bit in 20 bits while 8 bit long resource identifier(SNALH) is inserted from the 13th bit in 20 bits. The resource identifier can be replaced by SNALH. If a video session includes multiple streams of packets of different significance, path identifiers are all the same while resource (or significance) identifiers are assigned differently from each other streams.

Label Swapping

In the architecture including many MANE's along transmission path, the labels used in each MANE could be different. In this case, the precedent MANE may swap its labels to those used by following MANE. The swapping could be performed in the server before transmission after parsing every NALU.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

The present invention is useful in image processing industry which includes video encoding and decoding. And, it, also, can be used for transmission of encoded video over telecommunication networks and or so, especially it is useful for packet switched networks.

The invention claimed is:

1. A method for decoding a bitstream including Network Abstraction Layer Unit (NALU), comprising:
   receiving the bitstream including a NALU, the NALU including NAL Payload including encoded data and a NAL Header (NALH) including layer identification information;
   decoding the bitstream based on the layer identification information; and
   generating a current picture based on the bitstream,
   wherein the layer identification information is included in the NALH of a length of 2 bytes,
   wherein the layer identification information is mapped to at least one among a value for identifying a layer of the encoded data and a value for identifying a view of the encoded data, and
   wherein a size and a format of the layer identification information are set to a fixed value and a fixed format,
   wherein the fixed value and the fixed format are set regardless of whether the layer identification information is mapped to a value for identifying a layer of the encoded data, and
   wherein the NALH includes fixed 1-bit information (F information) of the NALU.

2. The method of claim 1,
   wherein the fixed value and the fixed format are set regardless of whether the layer identification information is mapped to a value for identifying a view of the encoded data.

3. The method of claim 1,
   wherein the layer identification information is mapped to at least one among the value for identifying a layer of the encoded data and the value for identifying a view of the encoded data using a mapping table.

4. The method of claim 1, wherein the layer identification information is received through at least one of a video parameter set, a sequence parameter set and a picture parameter set.

5. A method for encoding a bitstream including Network Abstraction Layer Unit (NALU), comprising:
   generating an encoded data by encoding an input picture;
   generating a NALU, the NALU including NAL Payload including the encoded data and a NAL Header (NALH) including layer identification information; and
   encoding the bitstream based on the NALU,
   wherein the layer identification information is included in the NALH of a length of 2 bytes, and
   wherein the layer identification information is mapped to at least one among a value for identifying a layer of the encoded data and a value for identifying a view of the encoded data,
   wherein a size and a format of the layer identification information are set to a fixed value and a fixed format,
   wherein the fixed value and the fixed format are set regardless of whether the layer identification information is mapped to a value for identifying a layer of the encoded data, and
   wherein the NALH includes fixed 1-bit information (F information) of the NALU.

6. The method of claim 5,
   wherein the fixed value and the fixed format are set regardless of whether the layer identification information is mapped to a value for identifying a view of the encoded data.

7. A non-transitory computer-readable storage medium storing a bitstream that is formed by a video encoding method, the video encoding method comprising:
   generating an encoded data by encoding an input picture;
   generating a NALU, the NALU including a NAL Payload including the encoded data and a NAL Header (NALH) including layer identification information; and
   encoding the bitstream based on the NALU,
   wherein the layer identification information is included in the NALH of a length of 2 bytes, and
   wherein the layer identification information is mapped to at least one among a value for identifying a layer of the encoded data and a value for identifying a view of the encoded data,
   wherein a size and a format of the layer identification information are set to a fixed value and a fixed format,
   wherein the fixed value and the fixed format are set regardless of whether the layer identification information is mapped to a value for identifying a layer of the encoded data, and
   wherein the NALH includes fixed 1-bit information (F information) of the NALU.

8. The non-transitory computer-readable storage medium of claim 7,
   wherein the fixed value and the fixed format are set regardless of whether the layer identification information is mapped to a value for identifying a view of the encoded data.

* * * * *